(12) United States Patent
Andela et al.

(10) Patent No.: US 7,186,533 B2
(45) Date of Patent: Mar. 6, 2007

(54) GRANULATES CONTAINING FEED-ENZYMES

(75) Inventors: Carl Sidonius Maria Andela, Delft (NL); Augustinus Bernardus Maria Klein Holkenborg, Delft (NL)

(73) Assignee: BASF Aktiengesellschaft (DE)

( * ) Notice: Subject to any disclaimer, the term of this patent is extended or adjusted under 35 U.S.C. 154(b) by 330 days.

(21) Appl. No.: 10/125,272

(22) Filed: Apr. 18, 2002

(65) Prior Publication Data

US 2003/0054511 A1 Mar. 20, 2003

Related U.S. Application Data

(63) Continuation of application No. 09/647,757, filed on Nov. 8, 2000, now abandoned.

(51) Int. Cl.
C12N 9/00 (2006.01)
(52) U.S. Cl. ..................................................... 435/183
(58) Field of Classification Search ................ 435/195
See application file for complete search history.

(56) References Cited

U.S. PATENT DOCUMENTS

| | | | |
|---|---|---|---|
| 4,106,991 A | 8/1978 | Markussen et al. |
| 4,689,297 A | 8/1987 | Good et al. |
| 4,976,977 A | 12/1990 | Johnson et al. |
| 5,080,917 A | 1/1992 | Itoh et al. |
| 5,391,371 A | 2/1995 | Jacobsen et al. |
| 5,827,709 A | 10/1998 | Barendse et al. |
| 5,856,451 A | 1/1999 | Olsen et al. |
| 5,972,669 A | 10/1999 | Harz et al. |
| 6,083,538 A | 7/2000 | Plijter et al. |
| 6,106,828 A | 8/2000 | Bisgard-Frantzen et al. |
| 6,136,772 A | 10/2000 | De Lima et al. |
| 6,475,546 B1 | 11/2002 | Harz et al. |
| 6,500,426 B1 | 12/2002 | Barendse et al. |
| 2002/0034549 A1 | 3/2002 | Becker et al. |
| 2003/0049811 A1 | 3/2003 | Barendse et al. |
| 2003/0054511 A1 | 3/2003 | Andele et al. |
| 2005/0163765 A1 | 7/2005 | Andele et al. |

FOREIGN PATENT DOCUMENTS

| EP | 0 193 829 | 9/1986 |
|---|---|---|
| EP | 0 257 996 A2 | 3/1988 |
| EP | 0 501 375 A1 | 9/1992 |
| EP | 0 628 630 A2 | 12/1994 |
| EP | 0 569 468 B1 | 4/1995 |
| EP | 0 758 018 A1 | 2/1997 |
| FR | 2 678 144 A | 12/1992 |
| GB | 1 362 365 | 8/1974 |
| GB | 1 483 591 | 8/1977 |
| GB | 2 167 758 A | 6/1986 |
| JP | 6305960 | 1/1994 |
| JP | 06 217 716 A | 8/1994 |
| JP | 07-236430 | 9/1995 |
| JP | 8109126 | 4/1996 |
| JP | 08-333239 | 12/1996 |
| WO | WO-88/01512 | 3/1988 |
| WO | WO-91/06638 | 5/1991 |
| WO | WO 92/12645 A1 | 8/1992 |
| WO | WO-93/07260 | 4/1993 |
| WO | WO-94/26883 | 11/1994 |
| WO | WO-96/22028 | 7/1996 |
| WO | WO-97/12958 | 4/1997 |
| WO | WO-97/16076 | 5/1997 |
| WO | WO 97/23606 | 7/1997 |
| WO | WO 97/39116 | 10/1997 |
| WO | WO 98/01544 | 1/1998 |
| WO | WO 98/54980 | 12/1998 |
| WO | WO 98/55599 | 12/1998 |
| WO | WO 99/51210 | 10/1999 |
| WO | WO 99/55310 | 11/1999 |
| WO | WO-00/36927 | 6/2000 |
| WO | WO-01/25411 | 4/2001 |

OTHER PUBLICATIONS

Database WPI, Section CH, WEEK 199809 Derwent Publications Ltd., London, GB, AN 1998-101045, XP00214307.
U.S. Appl. No. 09/959985, Harz et al.
U.S. Appl. No. 10/018339, Harz et al.
Mayer et al., "Herstellung magensaftresistent überzogener Enzympräparate für den Einsatz als Verdauungshilfen in der Tierernährung," *Wien. Tierärztl. Mschr.*, vol. 81, pp. 103-107 (1994).
ISL-method 61696.
ISL-method 61731.

*Primary Examiner*—Michael Meller
(74) *Attorney, Agent, or Firm*—Connolly Bove Lodge & Hutz LLP

(57) ABSTRACT

A process for the preparation of an enzyme-containing granulate is disclosed where an aqueous enzyme-containing liquid is mixed with a solid carrier and optionally additive ingredients and is mechanically processed into granules, dried and subsequently coated with polyethylene glycol. The solid carrier preferably essentially consists of an edible carbohydrate polymer. Additive ingredients that could be further incorporated in the formulation of the granules are a gel-forming or slow dissolving compound such as polyvinyl alcohol, water soluble inorganic salts comprising divalent cations and trehalose. This enzyme granulate is suitable for the manufacture of animal feed compositions by mixing feed ingredients with the granulate, treating with steam and pelleting. The compositions show improved enzyme stability during the pelleting process and during storage. At the same time, the dissolution time of the granule is very short so that the bioavailability of the enzyme to the animal is improved.

34 Claims, No Drawings

GRANULATES CONTAINING FEED-ENZYMES

This is a continuation of application Ser. No. 09/647,757 filed Nov. 8, 2000 now abandoned.

FIELD OF THE INVENTION

The present invention relates to the formulation of enzymes, preferably feed-enzymes, into granulates. These (edible) granulates can then be used in animal feed.

BACKGROUND OF THE INVENTION

Animal feed represents one of the largest costs incurred in keeping livestock and other animals. The use of various enzymes in animal, e.g. livestock, feed has become almost common practice. These enzymes are usually produced by culturing micro-organisms in large scale fermenters operated by industrial enzyme producers. At the end of the fermentation the resulting "broth" is usually subjected to a series of filtration steps to separate the biomass (the micro-organisms) from the desired enzyme (in solution). Subsequently the enzyme solution is concentrated and processed as a liquid (often after addition of various stabilisers) or to a dry formulation.

Liquid and dry enzyme formulations are used on a commercial scale by the feed industry. Liquid enzyme formulations may be added to the feed after pelleting in order to avoid heat inactivation of the enzyme which would occur during the pelleting process. However, the amounts of enzyme in the final feed preparations are usually very small which makes it difficult to achieve a homogeneous distribution of the enzyme in the feed, and liquids are notoriously more difficult to mix evenly into the feed than dry ingredients. In addition one needs specialised (expensive) equipment to add liquids to the feed after pelleting which is not currently available at most feed mills (due to the extra cost).

Dry enzyme formulations may be added to the feed before pelleting and therefore are subjected to heat-inactivation during pelleting. Preferred manufacturing protocols in the feed industry involve steam pelleting where the feed is subjected to steam injection(s) prior to pelleting, a process called conditioning. In the subsequent pelleting step the feed is forced through a die and the resulting strands are cut into suitable pellets of variable length. The moisture content immediately before pelleting is generally between 13% and 16%. During this conditioning process temperature may rise to 60–95° C. The combined effect of high moisture content and high temperature is detrimental to most enzymes. These disadvantages are also encountered in other types of thermomechanical treatments such as extrusion and expansion.

In order to overcome these problems, EP-A-0,257,996 suggests that the stability of enzymes in feed processing could be increased by the preparation of an enzyme "premix" where an enzyme-containing solution is absorbed onto a grain-based carrier consisting of flour, and the premix is subsequently pelleted and dried. However, these flour-based premixes are not suitable for more gentle methods of processing (of the dough-like premix) into granulates, such as low-pressure extrusion or high shear granulation, because of the gluey character of the flour-based premixes.

Various enzyme manufacturers have developed alternative formulation methods to improve the stability of dry enzyme products during pelleting and storage.

EP-A-0,569,468 refers to a formulation consisting of an enzyme-containing granulate that is coated with a high melting wax or fat alleged to improve resistance to pelleting conditions. The granulate is prepared by mixing a dry inorganic (e.g. sodium sulphate) carrier with the enzyme solution in a high shear granulator. As a consequence of the fat coating, the dissolution time of the granulate is long (about one hour). Therefore, the bioavaibility of the enzyme to the animal is decreased. In addition, the granulates have a wide particle size distribution. This makes it difficult to obtain an evenly distributed enzyme concentration after coating, since small particles absorb a relatively high amount of coating agent as compared to large particles. EP-A,569,468 further teaches that any beneficial effect of the coating with respect to pelleting stability is specific for the type of granulate coated, which in this case is based on a sodium sulphate carrier. However, the absorption capacity of these (sodium sulphate) carriers is much less than that of carriers such as flour, which is undesirable if one wishes to produce more concentrated enzyme-containing granulates.

WO97/39116 discloses formulations consisting of a pre-formed granule which is capable of absorbing at least 5% water. However, with these formulations a satisfactory solubility rate can only be achieved with very powerful mixing. Such formulation may therefore be effective in the detergent area but not in the intestinal tract of the animal.

WO98/54980 discloses enzy containing granules containing edible carbohydrates, of which preferably starch. Although these formulations readily dissolve in water and thus ensure a good bioavailability, the pelleting stability of these starch-based granulates is less than those obtained with the fat-coated granulates described above.

WO98/55599 demonstrates that high concentration phytase compositions which are cheaper to produce show an increase in stability, especially during a pelleting process in the preparation of animal feed (pellets). However, the pelleting stability of these compositions is also still beyond the stability obtained with the fat-coated granulates described above.

There is thus still a need for stable formulations of enzymes for use in animal feed that are cheap to produce, that combine a satisfactory pelleting stability with good bioavailability of the enzyme to the animal, and that have an optimal storage stability.

DESCRIPTION OF THE INVENTION

The present invention provides a process for the preparation of an enzyme-containing granulate suitable for use in an animal feed, the process comprising processing an enzyme, a solid carrier, optionally additives and water in appropriate relative amounts to obtain enzyme-containing granules, drying the granules, and coating the dried granules with polyethylene glycol.

The advantages of coating the granule with polyethylene glycol are first that this coating provides an efficient protection against the formation of dust. Furthermore, the polyethylene glycol coating is water-dissolvable. Although the dissolution time of the coated granules is increased as compared to the same uncoated granules, it is still much shorter (20 times) than the dissolution time of granules coated with a fat-type coating. A short dissolution time significantly improves the bioavailability of the enzyme to the animal. Finally, a polyethylene glycol coating does provide a good pelleting stability of the granule. Surprisingly, the polyethylene coating provides a good protection against steam and water, although the coating is water-dissolvable.

The polyethylene glycol which is used to coat the granules preferably has an (average) molecular weight of at least 4,000 Dalton. More preferred are polyethylene glycols with a molecular weight of 6,000 to 20,000 Dalton because the melting temperature of such polyethylene glycols is around 60° C.

The percentages used throughout this specification refer to weight percentages and are based on the weight of the final dry granulate, (end product) (unless otherwise indicated).

The polyethylene glycol coating is preferably applied at 1–20%, more preferably at 5–15%, and most preferably at about 8–12% of the weight of the granules.

In a preferred embodiment of the invention, polyethylene glycol is dissolved at a concentration of 50% (w/w) in water before it is applied to coat the granules.

Additional coatings may also be applied to the granulate to give additional (e.g. favoured) characteristics or properties, like low dust content, colour, protection of the enzyme from the surrounding environment, different enzyme activities in one granulate or a combination thereof. The granules can further be coated with a fat, wax, polymer, salt, unguent and/or ointment or a coating (e.g. liquid) containing a (second) enzyme or a combination thereof. It will be apparent that if desired several layers of (different) coatings can be applied.

The solid carrier to be used to prepare the granulate according to the present invention is a powder which can be compacted into a granule. The solid carrier to be used preferably has an average particle size ranging between 5 and 20 μm.

In a preferred embodiment of the present invention, the solid carrier essentially consists of an edible carbohydrate polymer. The numerous advantages of the use of an edible carbohydrate polymer are presented in patent application WO98/54980.

An edible carbohydrate polymer is a carbohydrate polymer which is allowed to be used as a feed additive. The edible carbohydrate polymer should be chosen so that it is edible by the animal for whom the feed is intended, and preferably digestible as well. The polymer preferably comprises hexose polymer units, more preferably glucose polymer units. Most preferably the carbohydrate polymer comprises α-D-glucopyranose units, amylose (a linear (1→4) α-D-glucan polymer) and/or amylopectin (a branched D-glucan with α-D-(1→4) and α-D-(1→6) linkages). Starch is the preferred carbohydrate polymer. Other suitable hexose-containing polymers that can be used instead of, or in addition to starch, include α-glucans, β-glucans, pectin (such as proto-pectin), and glycogen. Derivatives of these carbohydrate polymers, such as ethers and/or esters thereof, are also contemplated. Gelatnised starch is best avoided and thus may not be present Suitably the carbohydrate polymer is water-insoluble.

In the examples described herein corn, potato- and rice-starch is used. However, starch obtained from other (e.g. plant, such as vegetable or crop) sources such as tapioca, cassava, wheat maize, sago, rye, oat, barley, yam. sorghum, or arrowroot is equally applicable. Similarly, both native or modified (e.g. dextin) types of starch can be used in the invention. Preferably the carbohydrate (e.g. starch) contains little or no protein, preferably less than 5% (w/w), more preferably less than 2% (w/w), most preferably less than 1% (w/w).

In other embodiments of the invention, one or more additional ingredients may be incorporated into the granulate, e.g. as processing aids and/or for further improvement of the pelleting stability and/or the storage stability of the granulate. A number of such additives are discussed below.

In one embodiment of the invention, the additive comprises a water soluble inorganic salt (as suggested in EP-A-0,758,018). Preferably, the granules comprise at least 0.1% of a water soluble inorganic salt comprising a divalent cation, more preferably zinc. Most preferably, the inorganic salt is zinc-sulphate. The end product preferably contains from 500–1,500 mg Zn/kg end product, more preferably 700–1,300 mg Zn/kg end product and most preferably 900–1,100 mg Zn/kg end product. Divalent cations are preferred because they provide the best storage and processing stability. Sulphate is preferred as anion because it provides the best drying yield. The salts may be added (e.g. to the mixture) in solid form. Alternatively, the salt(s) may be dissolved in the water or enzyme-containing liquid prior to mixing with the solid carrier.

Further improvement of the pelleting stability may be obtained by the incorporation of hydrophobic, gel-forming or slowly dissolving compounds into the formulation. These may be provided by adding at least 0.1%, preferably at least 0.5% and more preferably at least 1% of the desired compound (w/w, based on the weight of water and solid carrier ingredients) to the mixture to be processed to granules. Suitable substances include denvatised celluloses, such as HPMC (hydroxy-propyl-methylcellulose), CMC (carboxy-methyl-cellulose), HEC (hydroxy-ethylellulose), polyvinyl alcohols (PVA); and/or edible oils. Edible oils, such as soy oil or canola oil, may be added (e.g. to the mixture to be granulated) as a processing aid.

In still another embodiment of the invention, the formulation comprises trehalose. Preferably, trehalose is applied in a concentration of 0.1–2.5% (w/w end product), more preferably in a concentration of 0.25–1%, most preferably in a concentration of 0.4–0.5%.

In the process of the invention the enzyme and water are preferably provided as an enzyme-containing (preferably aqueous) liquid, such as a solution or a slurry, that is from, or derived from, a microbial fermentation process. This fermentation process will usually be one in which the enzyme is produced. The fermentation process may result in a broth which contains the microorganisms (which produced the desired enzyme) and an aqueous solution. This aqueous solution, once separated from the microorganisms (for example, by filtration) can be the enzyme-containing aqueous liquid used in the invention. Thus in preferred embodiments the enzyme-containing aqueous liquid is a filtrate. Usually the enzyme will be in an active form. Preferably the liquid is in a concentrated form, such as an ultra-filtrate (UF), which may allow the production of a granulate with a desired activity level.

The amount of enzyme-containing liquid (and so enzyme) that can be absorbed onto the carrier is usually limited by the amount of water that can be absorbed. The enzyme solution may contain about 25% (w/w) dry matter. The amount of water added to the solid carrier is such that (substantially) all the water in the aqueous liquid is absorbed by all the components present in the solid carrier. The use of higher temperatures in order to absorb a greater amount of enzyme-containing liquid is also contemplated by the present invention, and indeed is preferable especially when dealing with thermostable enzymes. For these enzymes therefore mixing of the solid carrier and liquid (or enzyme and water) is performed at a temperature above 30° C., preferably above 40° C. and more preferably above 50° C. Alternatively or in addition, the liquid may be provided at this temperature. In general, non-swelling conditions of the solid carrier (at lower temperatures) are preferred to minimise loss arising from instability of (heat sensitive) enzymes at higher temperatures.

The water or enzyme-containing liquid may comprise one or more enzyme(s). Suitable enzyme(s) are feed enzymes to be included in animal feed (including pet food). The function of these feed enzymes is often to improve the feed conversion rate, e.g. by reducing the viscosity or by reducing the anti-nutritional effect of certain feed compounds. Feed enzymes (such as phytase) may also be used to reduce the amount of compounds which are harmful to the environment in the manure.

In a preferred embodiment, granules are prepared according to the process of the invention which contain a high concentration of a feed enzyme. The advantages of preparing phytase compositions at a high concentration was already described in WO98/55599.

Feed enzymes include: phosphatases, such as phytases (both 3-phytases and 6-phytases) and/or acid phosphatases; carbohydrases, such as amylolytic enzymes and/or plant cell wall degrading enzymes including cellulases such as β-glucanases and/or hemicellulases such as xylanases or galactanases; proteases or peptidases such as lysozyme; galactosidases, pectinases, esterases, lipases, preferably phospholipases such as the mammalian pancreatic phospholipases A2 and glucose oxidase. Preferably, feed enzymes have a neutral and/or acidic pH optimum. More preferably, the feed enzyme at least comprises an enzyme selected from the group consisting of phytases, xylanases, phospholipases and glucose oxidase. Most preferably, the feed enzyme at least comprises an enzyme selected from the group consisting of phytases and xylanases.

If the enzyme is a phytase, then the final granulate may preferably have a phytase activity ranging from 4,000 to 20,000 FTU/g, more preferably from 5,000 to 20,000 FTU/g, most preferably from 5,000 to 15,000 FTU/g. One Phytase Unit (FTU) is thereby defined as the amount of enzyme which liberates 1 mol inorganic phosphate per minute from sodium phytate (0.0051 mol/liter) at 37° C. and at a pH of 5.5 under the conditions that phytase activity was determined according to the procedure "ISL-method 61696" (manual vanadate assay).

If the enzyme is a xylanase, then the final granulate may preferably have a xylanase activity ranging from 5,000 to 100,000 EXU/g, more preferably from 10,000 to 100,000 EXU/g, and most preferably from 15,000 to 100,000 EXU/g. One Endo-Xylanase Unit (EXU) is thereby defined as the amount of enzyme which liberates 4.53 µmol reducing sugars, measured as xylose equivalents, per minute under the conditions of the procedure "ISL-method 61731".

ISL-methods are obtainable on request from DSM, Food Specialties, Agri Ingredients, Wateringseweg 1, P.O. Box 1, 2600 MA, Delft, The Netherlands.

In addition to these feed enzymes, the invention is equally applicable to non-enzymatic polypeptides with biological activities, such as antigenic determinants to be used as vaccines and/or polypeptides engineered to have an increased content of essential amino acids. The biological activity of these non-enzymatic polypeptides may be sensitive to thermal inactivation.

A preferred process according to the invention comprises the steps of:
  a. mixing an aqueous liquid containing the enzyme, a solid carrier tip, essentially consisting of an edible carbohydrate polymer and one or more additive components selected from the group consisting of a gel-forming or slowly dissolving compound such as polyvinyl alcohol, a water soluble inorganic salt comprising a divalent cation, and trehalose;
  b. mechanically processing the mixture simultaneously with or subsequently to the mixing, to obtain a granule;
  c. drying the granule;
  d. coating the granule with polyethylene glycol in a fluid bed coater.

The mechanical processing used in the present invention for preparing and/or granulating the mixture of the enzyme, water (e.g. an enzyme-containing liquid), solid carrier and, optionally, additives comprise known techniques frequently used in food, feed and enzyme formulation processes. This mechanical processing for instance comprises expansion, extrusion, spheronisation, pelleting, high-shear granulation, drum granulation, fluid bed agglomeration or a combination thereof. These processes are usually characterised by an input of mechanical energy, such as the rotation of a screw or a mixing mechanism, the pressure of a rolling mechanism of a pelleting apparatus, the movement of particles by a rotating bottom plate of a fluid bed agglomerator or the movement of the particles by a gas stream, or a combination thereof. These processes allow the solid carrier (e.g. in the form of a powder) to be mixed with the enzyme and water, for example an enzyme-containing liquid (an aqueous solution or slurry), and subsequently granulated. Alternatively the solid carrier can be mixed with the enzyme (e.g. in a powder form) to which water, such as a liquid (or slurry) is then added (which can act as granulating liquid).

In yet a further embodiment of the invention the granulate (e.g. an agglomerate) is formed by spraying or coating the enzyme-containing liquid onto a carrier, such as in a fluid bed agglomerator. Here the resulting granules can include an agglomerate as can be produced in a fluid bed agglomerator. Preferably the mixing of the enzyme-containing liquid and the solid carrier additionally comprises kneading of the mixture. This may improve the plasticity of the mixture in order to facilitate granulation.

If the granulate is formed by extrusion this is preferably performed at low pressure. This may offer the advantage that the temperature of the mixture being extruded will not or only slightly, increase. Low-pressure extrusion includes extrusion for example in a Fuji Paudal-type of basket- or dome-extruder.

The granules obtained can be subjected to rounding off (e.g. spheronisation), such as in a Marumeriser™, and/or compaction. The granules can be spheronised prior to drying since this may reduce dust formation in the final granulate and/or may facilitate any coating of the granulate.

The granules can then be dried, such as in a fluid bed drier or, in case of the fluid bed agglomeration, can be immediately dried (in the agglomerator) to obtain (solid dry) granulates. Other known methods for drying granules in the food, feed or enzyme industry can be used by the skilled person. Suitably the granulate is flowable. The drying preferably takes place at a product temperature of from 25 to 60° C., preferably from 30 to 50° C. Typically a dried granule contains about 5–9% moist.

To apply the polyethylene glycol and optionally other coating(s) onto the granulates a number of known methods are available which include the use of a fluidised bed, a high shear granulator, a mixer granulator, or a Nauta-type of mixer. In a preferred method for application of the polyethylene glycol onto the granulate, the polyethylene glycol is sprayed onto a fluidized bed of the granules to be coated at a temperature exceeding the melting point of the polyethylene glycol, e.g. preferably above 60° C. Subsequently the temperature of the fluidized bed is reduced to allow the polyethylene glycol coating to solidify. The coating step may include a simultaneous drying step where polyethylene glycol dissolved in water is applied.

The coating of the granule may already be started during the drying process. Alternatively, coating of the granule may take place subsequent to drying. Preferably, drying and coating are performed in the same apparatus.

Preferably the granules have a relatively narrow size distribution (e.g. they are monodisperse). This can facilitate a homogeneous distribution of the enzyme granulate in the feed pellets. The process of the invention tends to produce granulates with a narrow size distribution. The size distribution of the granulate is suitably between 100 μm and 2,000 μm, preferably between 200 μm and 1,800 μm, more preferably between 400 μm and 1,600 μm and most preferably between 700 and 1,000 μm. The granules may be of irregular (but preferably regular) shape, for example approximately spherical.

If necessary, an additional step may be included in the process to further narrow the size distribution of the granules, such as sieving. For instance, this additional sieving step will select granules having a size distribution between 0.7 and 1 mm.

The enzyme-containing granulate obtainable by these processes (which forms another aspect of the invention) seeks to solve or at least mitigate the problems encountered in the prior art The dissolution time of the granules is very short (a few minutes) and therefore the bioavailability of the enzyme to the animal is improved as compared to fat-coated granules. The enzyme concentration is higher so that the granule is cheaper to produce and the pelleting and storage stabilities are improved. Finally, the granulate is free of any soap, detergents, bleach or bleaching compounds, zeolites, binders and for that reason is edible and preferably also digestible.

The invention thus provides an enzyme-containing granulate obtainable by the above-mentioned processes and having the following characteristics. The granulate consists of polyethylene glycol-coated granules containing a feed enzyme, a solid carrier and, optionally, one or more additives. Preferably, said additives comprise at least one of a gel-forming or slow dissolving compound such as polyvinyl alcohol, a water soluble inorganic salt and trehalose.

The granulate of the invention is suitable for use in the preparation of an animal feed. In such processes the granulate is mixed with feed substances, as such, as part of a premix or as precursor to an animal feed. The characteristics of the granulate according to the invention allows its use as a component of a mixture which is well suited as an animal feed, especially if the mixture is steam treated, subsequently pelleted and optionally dried.

Thus, a further aspect of the present invention relates to a process for the preparation of animal feed, or a premix or precursor to an animal feed, the process comprising mixing the granulate provided by the present invention with one or more animal feed substances or ingredients.

The present invention also relates to a process for promoting the growth of an animal, the process comprising feeding an animal a diet that comprises the granulate provided by the invention. Here, the animal diet can include either the granulate itself, or the granulate present in a feed. Suitable animals include farm animals, such as livestock, pigs and poultry.

Another aspect of the invention thus relates to a composition comprising the granulate of the invention, which composition is preferably an edible feed composition such as an animal feed.

Still another aspect of the present invention relates to the use of the granulate of the invention in, or as a component of, an animal feed or for use in an animal diet.

Preferred features and characteristics of one aspect of the invention are equally applicable to another mutatis mutandis.

The following Examples are presented merely to illustrate the invention, and are not intended, or to be construed as, being limiting.

EXAMPLES

General Methods

Conditioning Step:

50 grams granules are mixed in 10 kg feed of the premix of choice and mixed just before the test with 240 kg of the same recipe. This 250 kg mixture is dosed in a mixer/conditioner by a dosing screw, at a speed of 600 kg/h, where it is heated by direct steam till 55 or 80° C. The residence time is about 10–15 seconds and then the hot mixture is pushed into the pelleting press. The pellets which come out of the die are between 75 and 82° C. and fall on a cooling belt. From this belt, samples are taken for the stability measurement.

Example 1

Pelleting Stability of Phytase in Pig Feed

In a Glatt VG 25 mixer 3000 grams of corn starch (C-gel from Cerestar) was mixed with 1380 grams of phytase Ultra-Filtrate (UF) with a pure enzyme content of 18.0%. After mixing, the mixture was extruded with a NICA E-220 extruder and spheronised in a Fuji Paudal QJ-400G spheroniser. The obtained particles were dried in a Glatt GPCG 1,1 fluid bed dryer (A). A second batch (B) was made by adding 70 grams of glycerol to 1420 grams of UF, which correspond with 27% glycerol to the pure enzyme, and mixed with the starch. A third batch (C) was made by adding 210 grams of sorbitol to 1490 grams of UF, which correspond with 78% sorbitol to the pure enzyme, and mixed with the starch. A fourth batch (D) was made by adding 210 grams of inositol to 1490 grams of UF, which correspond with 78% inositol to the pure enzyme, and mixed with the starch. The competetive sample is the high speed granulate Phytase Novo® CT.

TABLE 1

Residual phytase activity in pig feed in % after conditioning/pelleting at 55/75° C.

| Sample no. with addition | Residual activity in % |
|---|---|
| A standard | 71 |
| B glycerol | 58 |
| C sorbitol | 69 |
| D inositol | 73 |
| Competitive sample | 70 |

Polyols are generally known to increase the stability of proteins. In this Example we observed however that none of the polyols tested significantly improved the pelleting stability of phytase. Glycerol even produced a significant decrease in the pelleting stability of phytase.

The pig feed (feed premix) used for pelleting stability consisted of:

Corn (20.7%), barley (40%), manioc (10%), oat (10%), soy (13%), fish meal (3%), wheat middlings (0.84%), soy oil (0.5%), limestone (1.2%), salt (0.2%) micro elements (0.06%), methionine (0.05%), choline chloride at 50% (0.05%), and Calcium propionate (0.4%), up to a total of 100%.

Example 2

Pelleting Stability of Phytase in Broiler Feed

In the same way as in Example 1 the following samples were made with a phytase UF with a pure enzyme content of 18.4%. The first batch (E) was made with 1300 grams phytase UF in the starch. The second batch (F) was made by adding 13 grams of xanthan gum to 1310 grams of UF, which correspond with 5.4% xanthan gum to the pure enzyme, and mixed with the starch.

TABLE 2

Residual phytase activity in broiler feed in % after conditioning/pelleting at 80/82° C.

| Sample no. with addition | Residual activity in % |
|---|---|
| E standard | 21 |
| F xanthan gum | 20 |

Again no improvement of the pelleting stability of phytase was observed.

The broiler feed consisted of:

Maize (50%), peas (3.5%), soybean meal (28%), tapioca (2.4%), meat meal (3.6%), fish meal (1%), feather meal (1%), soybean oil (1.8%), animal fat (3.5%), vitamin/mineral premix (0.9%), limestone (0.8%), monocalcium-phosphate (0.9%), salt (0.3%), Mervit (Premervo, Utrecht, The Netherlands) 394 (0.7%), Mervit 393 (1.5%), up to a total of 100%.

Example 3

Pelleting Stability of Phytase in Broiler Feed

In the same way as in Example 1 the following samples were made with a phytase UF with a pure enzyme content of 17.3%. The first batch (G) was made with 1470 grams phytase UF in the starch. The second batch (H) was made by adding 15 grams of trehalose (di-hydrate from Fluka) to 1480 grams of UF, which correspond with 5.9% trehalose to the pure enzyme, and mixed with the starch.

TABLE 3

Residual phytase activity in broiler feed in % after conditioning/pelleting at 80/82° C.

| Sample no. with addition | Residual activity in % |
|---|---|
| G standard | 36 |
| H trehalose | 45 |
| Competetive sample, high speed granulate | 64 |

Surprisingly, the addition of the polyol trehalose does improve the pelleting stability of the enzyme.

Example 4

Pelleting Stability of Phytase in Broiler Feed

In the same way as in Example 1 the following samples were made with a phytase UF with a pure enzyme content of 18.6%. The first batch (I) was made with 1330 grams phytase UF in the starch. The second batch (J) was made by adding 27 grams of trehalose to 1330 grams of UF, which correspond with 10.9% trehalose to the pure enzyme, and mixed with the starch. The third batch (K) was made by adding 66 grams of trehalose to 1330 grams of UF, which correspond with 26.7% trehalose to the pure enzyme, and mixed with the starch. The fourth batch (L) was made by adding 13 grams of trehalose, 13 grams of PVA (51-05 from Dupont) and 13 grams of $ZnSO_4 0.7aq$ to 1330 grams of UF, which correspond with 5.3% of the trehalose and the PVA, and 2.8% of the dry salt to the pure enzyme, and mixed with the starch. This latter sample was coated in a fluid bed coater with 10% PEG 6000 by heating up the granulate mixed with the PEG till 62° C. and cooled down again (M). Similarly, a sample of batch (L) was coated with 10% PEG 20,000 (diluted in water 1:2 in order to reduce viscosity) by spraying onto the granulate in a fluid bed coater at 62° C., dried and subsequently cooled (N).

TABLE 4

Residual phytase activity in broiler feed in % after conditioning/pelleting at 81/80° C.

| Sample no. with addition | Residual activity in % |
|---|---|
| I standard | 28 |
| J 2% trehalose | 28 |
| K 5% trehalose | 34 |
| L 1% $ZnSO_4$-1% PVA-1% trehalose | 40 |
| M as L with PEG 6000 coating | 42 |
| N as L with PEG 20,000 coating | 52 |

The highest pelleting stability of the enzyme is obtained with PEG-coated granules containing trehalose, $ZnSO_4$ and PVA.

Example 5

Pelleting Stability of Phytase in Broiler Feed

In the same way as in Example 1 the following samples were made with a phytase UF with a pure enzyme content of 18.0%. The first batch (O) was made with 1368 grams of phytase UF with 14 grams of $ZnSO_4 0.6aq$ and 14 grams PVA 5/88 (from ERKOL SA.), which corresponds to 3.0% of the dry salt and 5.3% of the PVA to the pure enzyme. The second batch (P) was made in a similar way, but with 14 grams trehalose extra in the recipe (5.3% of trehalose to the pure enzyme). Both recipes were coated in a fluid bed coater (STREA from NIRO-AEROMATIC) with 10% PEG 6000, dissolved in the same amount of water, resulting in samples Q and R. The four samples were tested in a pelleting trial.

TABLE 5

Residual phytase activity in broiler feed in % after conditioning/pelleting at 80/80° C.

| Sample no. with addition | Residual activity in % |
|---|---|
| O product with $ZnSO_4$ and PVA | 32 |
| P as O with 5.3% trehalose | 32 |
| Q as O with 10% PEG 6000 coating | 44 |
| R as P with 10% PEG 6000 coating | 44 |

The polyethylene glycol coating significantly improved the pelleting stability of the samples.

Example 6

Dissolution Time of Phytase-Containing Granules

Several of the samples prepared in the previous Examples were dissolved in buffer and samples were taken at regular intervals. The dissolution time of the granules was not or only slightly increased as a consequence of the PEG coating.

TABLE 6

Dissolution time expressed as % dissolved after x minutes.

| Sample | 1 min. | 2 min. | 5 min. | 10 min. | 15 min. | 30 min. | 60 min. |
|--------|--------|--------|--------|---------|---------|---------|---------|
| L      | 100    | 100    | 98     | 99      | 100     | 99      | 100     |
| M      | 98     | 99     | 100    | 98      | 99      | 99      | 100     |
| N      | 82     | 96     | 99     | 100     | 99      | 100     | 99      |
| HS gran | 4     | 6      | 20     | 30      | 38      | 72      | 95      |

HS gran is Phytase Novo ® CT

Example 7

Stability of Phytase-Containing Granules

For the analysis of the shelf-stability of the granules, several samples were tested at 35° C. in closed vials.

TABLE 7

Shelf-stability of different samples.

| Sample | 0 weeks | 2 weeks | 4 weeks | 8 weeks | 12 weeks | 16 weeks |
|--------|---------|---------|---------|---------|----------|----------|
| A      | 100     | 87      | 73      | 69      | 67       | 65       |
| B      | 100     | 87      | 77      | 67      | —        | —        |
| C      | 100     | 84      | 64      | 58      | —        | —        |
| D      | 100     | 87      | 72      | 62      | —        | —        |
| G      | 100     | 87      | 82      | 78      | —        | —        |
| H      | 100     | 88      | 80      | 76      | —        | —        |
| I      | 100     | 87      | 78      | 76      | 70       | 69       |
| J      | 100     | 86      | 78      | 77      | 69       | 69       |
| K      | 100     | 88      | 81      | 74      | 70       | 69       |
| L      | 100     | 97      | 93      | 96      | 87       | 86       |
| M      | 100     | 94      | 93      | 92      | 90       | 90       |

Example 8

Bioavailability of Phytase Using Different Formulations

The following phytase formulations and Mono Calcium Phosphate (MCP) were added to a standard corn/soy broiler feed at three different doses (75, 150 and 225 FTU/kg) and fed to broilers during 28 days. The broiler feed also contained endogenous phytase activity.

* Natuphos ® 5000 G, (standard product)
Composition:

| Phytase UF | 94.49 kg |
| Trehalose | 0.91 kg |
| Polyvinylalcohol | 0.91 kg |
| ZnSO4.6H2O | 0.97 kg |

-continued

| Starch | 200.00 kg |
| Addition of water | 7.11 kg |
| Total weight | 304.39 kg |
| Total weight dried product | 215.02 kg |

* Natuphos ® 5000 G, (PEG coated)
Composition:

| Phytase SD | 11.54 kg |
| Phytase UF | 99.88 kg |
| Trehalose | 1.14 kg |
| Polyvinylalcohol | 1.14 kg |
| ZnSO4.6H2O | 1.14 kg |
| Starch | 200.00 kg |
| Addition of water | 7.10 kg |
| Total weight | 306.85 kg |
| Total weight dried product | 228.82 kg |

Coated with 10% 1/1/2 solution PEG6000/PEG20000/H2O
(Phytase SD: Phytase Spraydried Powder)

* Phytase Novo ® CT, competitor product, fat-coated
* MCP: positive control groups After 28 days the growth of the animals was determined (Table 8). Regression analysis was applied to enable comparison of the growth per fytase formulation (Table 9), whereby the growth was calculated as follows:

Growth=intercept+regression coefficient*phytase activity (FTU/kg).

TABLE 8

Growth of broilers after 28 days

| Product | Activity (FTU/kg[1]) | Growth (g) |
|---------|---------------------|------------|
| Control | 82 | 1292 |
| MCP (0.2 g P/kg) | 86 | 1459 |
| MCP (0.4 g P/kg) | 115 | 1581 |
| MCP (0.6 g P/kg) | 116 | 1674 |
| NPHG 518 RE1 | 185 | 1433 |
| NPHG 518 RE1 | 281 | 1456 |
| NPHG 518 RE1 | 393 | 1528 |
| NPHG 518 RE2A | 208 | 1452 |
| NPHG 518 RE2A | 375 | 1475 |
| NPHG 518 RE2A | 416 | 1629 |
| Phytase Novo CT | 182 | 1331 |
| Phytase Novo CT | 274 | 1481 |
| Phytase Nova CT | 401 | 1458 |

[1]determined phytase activity.

TABLE 9

Intercept: 1302

| | Estimate | % |
|---|----------|---|
| MCP | — | |
| NPHG 518 RE1 (ZnSO4) | 0.583 | 100 |
| NPHG 518 RE2 (ZnSO4 + PEG) | 0.649 | 111 |
| Phytase Novo CT | 0.434 | 74 |

It can be concluded that the bioavailability of phytase in the formulation coated with polyethylene glycol is much higher than that of phytase in the formulation containing a fat-coating.

The invention claimed is:

1. A process for the preparation of an enzyme-containing granulate suitable for use in animal feed, the process comprising:

(a) mixing a feed enzyme, a solid carrier, water, and at least one additive in an effective amount;
(b) mechanically processing the mixture obtained in (a), simultaneously with or subsequently to the mixing, to obtain enzyme-containing granules;
(c) drying the granules; and
(d) coating the granules obtained in (c) with polyethylene glycol, wherein the polyethylene glycol has a molecular weight ranging from 6,000 to 20,000 daltons.

2. A process according to claim 1, wherein the polyethylene glycol is applied at 1–20% of the weight of the granules.

3. A process according to claim 2, wherein the polyethylene glycol used to coat the granules is first dissolved in water at a concentration of 50% (w/w).

4. The process according to claim 1, wherein the water and enzyme are provided as an enzyme-containing aqueous liquid.

5. The process according to claim 4, wherein the liquid is a filtrate from a fermentation process in production of the enzyme.

6. The process according to claim 1, wherein the solid carrier consists essentially of an edible carbohydrate polymer.

7. The process according to claim 1, wherein the additive comprises at least 0.1% of a polyvinyl alcohol.

8. The process according to claim 1, wherein the additive comprises at least 0.1% of a water soluble inorganic salt comprising a divalent cation.

9. The process according to claim 8, wherein the inorganic salt is zinc sulfate at 500 to 1500 mg Zn/kg end product.

10. The process according to claim 1, wherein the additive comprises from between 0.4 to 0.5% (w/w) of trehalose.

11. A process according to claim 1, wherein the feed enzyme comprises at least one enzyme selected from the group consisting of phytases, xylanases, phospholipases and glucose oxidase.

12. The process according to claim 11, wherein the granule has a phytase activity ranging from 4,000 to 20,000 FTU/g.

13. The process according to claim 1, wherein the process comprises the steps of:
(a) mixing an aqueous liquid containing the enzyme with the solid carrier, and with one or more additives comprising a polyvinyl alcohol, a water soluble inorganic salt comprising a divalent cation, and trehalose;
(b) mechanically processing the mixture obtained in (a), simultaneously with or subsequently to the mixing, to obtain granules;
(c) drying the granules obtained in (b);
(d) coating the granules obtained in (c) with polyethylene glycol in fluid bed coater.

14. The process according to claim 13, wherein the mechanical processing comprises extrusion, pelleting, high-shear granulation, expansion, fluid bed agglomeration or a combination thereof.

15. The process according to claim 14, wherein the mechanical processing is extrusion performed at low pressure and/or in a basket- or dome-extruder.

16. A process according to claim 13, wherein an enzyme-containing aqueous liquid and the solid carrier are mixed and the resulting mixture is kneaded before granulation.

17. The process according to claim 13, wherein the granules obtained are spheronised prior to drying.

18. The process according to claim 13, wherein the size distribution of the granules ranges from 100 to 2,000 µm.

19. An enzyme-containing granulate coated with polyethylene glycol obtained by a process according to claim 1.

20. A process for the preparation of an animal feed, or a premix or precursor to an animal feed, the process comprising mixing a granulate according to claim 19 with one or more animal feed substances or ingredients.

21. The process according to claim 20, wherein the one or more animal feed substances or ingredients is treated with steam, pelletized and optionally dried.

22. A feed composition wherein the composition comprises the granulate according to claim 19.

23. A process for promoting growth of an animal, the process comprising feeding an animal a diet that comprises a granulate according to claim 19.

24. A process for promoting growth of an animal, the process comprising feeding an animal a diet that comprises a composition according to claim 22.

25. A process according to claim 2, wherein the polyethylene glycol is applied at 5–15% of the weight of the granules.

26. A process according to claim 2, wherein the polyethylene glycol is applied at 8–12% of the weight of the granules.

27. The process according to claim 9 wherein the inorganic salt is zinc sulfate in an amount such as to have 700 to 1,300 mg Zn/kg end product.

28. The process according to claim 9 wherein the inorganic salt is zinc sulfate in an amount such as to have 900 to 1,100 mg Zn/kg end product.

29. The process according to claim 11 wherein the enzyme comprises at least one enzyme selected from the group consisting of phytases and xylanases.

30. The process according to claim 12 wherein the granule has a phytase activity ranging from 5,000 to 20,000 FTU/g.

31. The process according to claim 12 wherein the granule has a phytase activity ranging from 5,000 to 15,000 FTU/g.

32. The process according to claim 18, wherein the size distribution of the granules ranges from 200 to 1800 µm.

33. The process according to claim 18, wherein the size distribution of the granules ranges from 400 to 1600 µm.

34. The process according to claim 18, wherein the size distribution of the granules ranges from 700 to 1,000 µm.

* * * * *

UNITED STATES PATENT AND TRADEMARK OFFICE
CERTIFICATE OF CORRECTION

| | | |
|---|---|---|
| PATENT NO. | : 7,186,533 B2 | Page 1 of 2 |
| APPLICATION NO. | : 10/125272 | |
| DATED | : March 6, 2007 | |
| INVENTOR(S) | : Carl Sidonius Maria Andela et al. | |

It is certified that error appears in the above-identified patent and that said Letters Patent is hereby corrected as shown below:

In the Title Page:

Related U.S. Application Data

Item "(63) Continuation of application No. 09/647,757, filed on Nov. 8, 2000, now abandoned." Should read -- (63) Continuation of application No. 09/647,757, filed on Nov. 8, 2000, now abandoned, filed as 371 of international application No. PCT/EP00/01154, filed on Feb. 10, 2000.--

Title Page Foreign Application Priority Data was omitted, please insert:

-- (30) Foreign Application Priority Data

Feb. 10, 1999    (EP)    99200435.8

May 12, 1999    (EP)    99201523.0    --

In Claim 1, in column 13, on line 9, "weight ranging from 6,000 to 20,000 daltons." should read -- weight ranging from 6,000 to 20,000 daltons, the granules obtained in (d) having 1) a dissolution time shorter than granules coated with oil or fat, and 2) a pelleting stability greater than uncoated granules.--

UNITED STATES PATENT AND TRADEMARK OFFICE
CERTIFICATE OF CORRECTION

PATENT NO. : 7,186,533 B2
APPLICATION NO. : 10/125272
DATED : March 6, 2007
INVENTOR(S) : Carl Sidonius Maria Andela et al.

It is certified that error appears in the above-identified patent and that said Letters Patent is hereby corrected as shown below:

In Claim 15, in column 14, on lines 2 through 3, "mechanical processing is extrusion performed at low pressure and/or in a basket- or dome-extruder." should read -- mechanical processing is extrusion performed at low pressure or in a basket- or dome-extruder.--

Signed and Sealed this

Eighteenth Day of September, 2007

JON W. DUDAS
*Director of the United States Patent and Trademark Office*